US011434751B2

(12) United States Patent
McBride et al.

(10) Patent No.: US 11,434,751 B2
(45) Date of Patent: Sep. 6, 2022

(54) AUTONOMOUS TOOL

(71) Applicant: Hunting Titan, Inc., Pampa, TX (US)

(72) Inventors: Gene McBride, Houston, TX (US); Garrett M. Hohmann, Houston, TX (US); David Dobsky, Houston, TX (US); Faraidoon Pundole, Sugar Land, TX (US)

(73) Assignee: Hunting Titan, Inc., Pampa, TX (US)

( * ) Notice: Subject to any disclaimer, the term of this patent is extended or adjusted under 35 U.S.C. 154(b) by 0 days.

(21) Appl. No.: 17/064,399

(22) Filed: Oct. 6, 2020

(65) Prior Publication Data

US 2021/0032981 A1 Feb. 4, 2021

Related U.S. Application Data

(63) Continuation of application No. 16/971,976, filed as application No. PCT/US2019/019267 on Feb. 22, 2019, now Pat. No. 11,274,546.

(Continued)

(51) Int. Cl.
*E21B 23/00* (2006.01)
*E21B 29/02* (2006.01)
*E21B 41/00* (2006.01)
*E21B 43/116* (2006.01)
*E21B 43/119* (2006.01)
*E21B 47/092* (2012.01)

(Continued)

(52) U.S. Cl.
CPC ............ *E21B 47/092* (2020.05); *E21B 23/00* (2013.01); *E21B 29/02* (2013.01); *E21B 41/00* (2013.01); *E21B 43/116* (2013.01); *E21B 43/119* (2013.01); *G01P 3/66* (2013.01); *E21B 17/1078* (2013.01)

(58) Field of Classification Search
CPC ...... E21B 17/1078; E21B 23/00; E21B 29/02; E21B 41/00; E21B 43/116; E21B 43/119; E21B 47/092; E21B 43/114; E21B 43/117; E21B 47/024; E21B 47/09; G01P 3/66; G01V 3/28
See application file for complete search history.

(56) References Cited

U.S. PATENT DOCUMENTS 4,502,010 A * 2/1985 Kuckes .................... G01V 3/26
324/247
10,794,159 B2 * 10/2020 Eitschberger ......... E21B 43/117
(Continued)

FOREIGN PATENT DOCUMENTS

WO 2017147329 A1 8/2017

OTHER PUBLICATIONS

Notification of Transmittal of the International Search Report and the Written Opinion of the International Searching Authority, PCT Application No. PCT/US19/119267, dated May 7, 2019, 12 pages.

*Primary Examiner* — Daniel P Stephenson

(57) ABSTRACT

A method, system, and apparatus for determining the location of a tool traveling down a wellbore by measuring a first borehole magnetic anomaly with respect to time at two known locations on a tool, comparing the time difference between the two measurements, then calculating the velocity of the tool based on the comparison, then further calculating the distance traveled by the tool in the wellbore based on the velocity calculation, then executing a series of commands at a predetermined location in the wellbore.

20 Claims, 7 Drawing Sheets

Related U.S. Application Data

(60) Provisional application No. 62/634,740, filed on Feb. 23, 2018.

(51) Int. Cl.
*G01P 3/66* (2006.01)
*E21B 17/10* (2006.01)

(56) References Cited

U.S. PATENT DOCUMENTS

| | | | |
|---|---|---|---|
| 2005/0269083 A1 | 12/2005 | Burris, II et al. | |
| 2009/0166035 A1* | 7/2009 | Almaguer | E21B 29/00 166/254.1 |
| 2009/0195244 A1* | 8/2009 | Mouget | G01V 3/28 324/221 |
| 2010/0163224 A1* | 7/2010 | Strickland | E21B 47/13 166/254.1 |
| 2011/0147083 A1* | 6/2011 | Mauldin | E21B 7/04 175/50 |
| 2012/0013339 A1* | 1/2012 | Kuckes | E21B 47/0228 324/346 |
| 2013/0118805 A1* | 5/2013 | Moody-Stuart | E21B 43/116 175/2 |
| 2014/0152298 A1* | 6/2014 | Hallunbæk | E21B 47/092 324/207.13 |
| 2014/0375468 A1 | 12/2014 | Wilkinson et al. | |
| 2015/0308980 A1* | 10/2015 | Bittar | E21B 47/00 73/152.54 |
| 2018/0038218 A1* | 2/2018 | Hay | E21B 47/024 |
| 2019/0085685 A1* | 3/2019 | McBride | G01V 3/28 |
| 2019/0169979 A1* | 6/2019 | Nguyen | E21B 47/013 |
| 2019/0265381 A1* | 8/2019 | Sugiura | G01V 3/26 |
| 2020/0018139 A1* | 1/2020 | Eitschberger | E21B 43/117 |
| 2020/0400013 A1* | 12/2020 | McBride | E21B 43/119 |
| 2021/0017855 A1* | 1/2021 | McBride | E21B 47/09 |
| 2021/0032981 A1* | 2/2021 | McBride | E21B 29/02 |
| 2021/0032982 A1* | 2/2021 | McBride | E21B 41/00 |

* cited by examiner

AUTONOMOUS TOOL

RELATED APPLICATIONS

This application is a U.S. continuation application of U.S. Nonprovisional patent application Ser. No. 16/971,976, filed Aug. 21, 2020, which is a 371 of International Application No. PCT/US19/19267, filed Feb. 22, 2019, which claims priority to U.S. Provisional Application No. 62/634,740, filed on Feb. 23, 2018.

BACKGROUND OF THE INVENTION

Generally, when completing a subterranean well for the production of fluids, minerals, or gases from underground reservoirs, several types of tubulars are placed downhole as part of the drilling, exploration, and completions process. These tubulars can include casing, tubing, pipes, liners, and devices conveyed downhole by tubulars of various types. Each well is unique, so combinations of different tubulars may be lowered into a well for a multitude of purposes.

A subsurface or subterranean well transits one or more formations. The formation is a body of rock or strata that contains one or more compositions. The formation is treated as a continuous body. Within the formation hydrocarbon deposits may exist. Typically a wellbore will be drilled from a surface location, placing a hole into a formation of interest. Completion equipment will be put into place, including casing, tubing, and other downhole equipment as needed. Perforating the casing and the formation with a perforating gun is a well-known method in the art for accessing hydrocarbon deposits within a formation from a wellbore.

Explosively perforating the formation using a shaped charge is a widely known method for completing an oil well. A shaped charge is a term of art for a device that when detonated generates a focused explosive output. This is achieved in part by the geometry of the explosive in conjunction with an adjacent liner. Generally, a shaped charge includes a metal case that contains an explosive material with a concave shape, which has a thin metal liner on the inner surface. Many materials are used for the liner; some of the more common metals include brass, copper, tungsten, and lead. When the explosive detonates the liner metal is compressed into a super-heated, super pressurized jet that can penetrate metal, concrete, and rock.

A perforating gun has a gun body. The gun body typically is composed of metal and is cylindrical in shape. Within a typical gun tube is a charge holder or carrier tube, which is a tube that is designed to hold the actual shaped charges. The charge holder will contain cutouts called charge holes where the shaped charges will be placed.

A shaped charge is typically detonated by a booster or igniter. Shaped charges may be detonated by electrical igniters, pressure activated igniters, or detonating cord. One way to ignite several shaped charges is to connect a common detonating cord that is placed proximate to the igniter of each shaped charge. The detonating cord is comprised of material that explodes upon ignition. The energy of the exploding detonating cord can ignite shaped charges that are properly placed proximate to the detonating cord. Often a series of shaped charges may be daisy chained together using detonating cord.

Another type of explosive used in completions is a jet cutter. This is an explosive that creates a radial explosion. It can be used to sever tubulars, including downhole casing.

A firing head is used to detonate the detonating cord in the perforating gun. The firing head may be activated by an electrical signal. Electricity may be provided by a wireline that ties into the cablehead at the top of a tool string. The electrical signal may have to travel through several components, subs, and tools before it gets to the firing head. A reliable electrical connector is needed to ensure the electrical signal can easily pass from one component to the next as it moves down the tool string. The electrical signal is typically grounded against the tool string casing. As a result, the electrical connections must be insulated from tool components that are in electrical contact with the tool string casing.

SUMMARY OF EXAMPLE EMBODIMENTS

An example embodiment may include an apparatus for use downhole comprising a top housing with a first end, a second end, an axis, a middle housing with a first end located proximate to the second end of the top housing, and a second end, wherein the middle housing is coaxial with the axis, a braking housing with a first end located proximate to the second end of the middle housing, and a second end, wherein the braking housing is coaxial with the axis, a bottom housing with a first end located proximate to the second end of the braking housing, and a second end, wherein the bottom housing is coaxial with the axis, a first magnetic anomaly sensor located within the top housing, a second magnetic anomaly sensor located within the bottom housing and located a fixed axial distance from the first magnetic anomaly sensor, a processor located within the middle housing, operatively connected to the first magnetic anomaly sensor and the second magnetic anomaly sensor, wherein the processor calculates the velocity of the apparatus based on comparing measurements taken from the first magnetic anomaly sensor and the second magnetic anomaly sensor, at least one radially retractable braking arm located in the braking housing, wherein the processor can command the braking arm to extend against a wellbore and stop the downhole descent of the apparatus at a predetermined location.

A variation of the example embodiment may include having a plurality of electromagnetic coils disposed within the first magnetic anomaly sensor. It may have a first electromagnetic coil disposed within the first magnetic anomaly sensor adapted to generate an electromagnetic field. There may be a second electromagnetic coil disposed within the first magnetic anomaly sensor adapted to generate an electromagnetic field. There may be a third electromagnetic coil disposed within the first magnetic anomaly sensor adapted to detect an electromagnetic field. There may be a fourth electromagnetic coil disposed within the first magnetic anomaly sensor adapted to detect an electromagnetic field. There may be a fifth electromagnetic coil disposed within the first magnetic anomaly sensor adapted to detect an electromagnetic field. There may be a sixth electromagnetic coil disposed within the first magnetic anomaly sensor adapted to detect an electromagnetic field. The at least one radially retractable braking arm may be a plurality of radially retractable braking arms located about the axis. It may include a perforating gun assembly coupled to the top housing, wherein the processor is electrically coupled to the perforating gun assembly and can fire the perforating gun assembly at a predetermined location. It may include a cutter assembly coupled to the top housing, wherein the processor is electrically coupled to the cutter assembly and can fire the cutter assembly at a predetermined location. It may include a setting tool coupled to the bottom housing, wherein the processor is electrically coupled to the setting tool and can activate the setting tool at a predetermined location to plug the wellbore.

A variation of the example embodiment may include a first sub coupled to the first end of the top housing. It may include a second sub coupled to the second end of the top housing and coupled to the first end of the bottom housing. It may include a third sub coupled to the second end of the bottom housing. The first centralizer may have a hollow cylindrical shape. The second centralizer may have a substantially hollow cylindrical shape.

A variation of the example embodiment may include a cylindrical core located coaxial with the axis and passing through the first, second, third, fourth, fifth, and sixth electromagnets. There may be a plurality of electromagnetic coils disposed within the second magnetic anomaly sensor. There may be a seventh electromagnetic coil disposed within the second magnetic anomaly sensor adapted to generate an electromagnetic field. It may have an eighth electromagnetic coil disposed within the second magnetic anomaly sensor adapted to generate an electromagnetic field. It may have a ninth electromagnetic coil disposed within the second magnetic anomaly sensor adapted to detect an electromagnetic field. It may have a tenth electromagnetic coil disposed within the second magnetic anomaly sensor adapted to detect an electromagnetic field. It may have an eleventh electromagnetic coil disposed within the second magnetic anomaly sensor adapted to detect an electromagnetic field. It may have a twelfth electromagnetic coil disposed within the second magnetic anomaly sensor adapted to detect an electromagnetic field.

A variation of the example embodiment may include a cylindrical core located coaxial with the axis and passing through the first, second, third, fourth, fifth, and sixth electromagnets. The processor includes a data logger. The processor may include a plurality of processors. The processor may compute the velocity by comparing measurements taken from the first magnetic anomaly sensor and the second magnetic anomaly sensor. It may include a first centralizer surrounding a portion of the first end of the top housing. It may include a second centralizer surrounding a portion of the second end of the top housing and a portion of the second end of the bottom housing. The top housing may be composed of a frangible material. The top housing may be composed of a ceramic material. The top housing may be composed of steel. The bottom housing may be composed of a frangible material. The bottom housing may be composed of a ceramic material. The bottom housing may be composed of steel. The processor may calculate distance traveled by integrating the calculated velocity with respect to time. The processor may calculate the distance traveled using a summation of the calculated velocity with respect to time. The processor may calculate the distance traveled by averaging the calculated velocity over a plurality of measurements and multiplying by time. The processor may calculate the distance traveled using a piecewise summation with respect to time.

An example embodiment may include an apparatus for use downhole comprising a cylindrical housing with a first end, a second end, an axis, a first magnetic anomaly sensor located within the cylindrical housing, a second magnetic anomaly sensor located within the cylindrical housing and located a fixed axial distance from the first magnetic anomaly sensor, a processor located within the cylindrical housing, operatively connected to the first magnetic anomaly sensor and the second magnetic anomaly sensor, wherein the processor compares the measurements of the first magnetic anomaly sensor, the second magnetic anomaly sensor, the time differential of those measurements, and with the fixed axial distance between the two sensors, calculates the instantaneous velocity of the tool and at least one radially retractable braking arm located in the cylindrical housing, wherein the processor can command the braking arm to extend against a wellbore and stop the downhole descent of the apparatus at a predetermined location.

A variation of the example may include having a plurality of processors. It may have stored log data of the wellbore and compare that to the two measurements to fine tune the velocity calculation. The first magnetic anomaly sensor may include a plurality of electromagnetic coils oriented about the axis. The second magnetic anomaly sensor may include a plurality of electromagnetic coils wrapped oriented about the axis. The cylindrical housing may be composed of a frangible material. The cylindrical housing may be composed of a ceramic material. The cylindrical housing may be composed of steel. The processor may calculate the distance traveled by the tool based on the calculated instantaneous velocity. The processor may calculate the distance traveled by the tool by integrating the calculated velocity with respect to time. The processor may calculate the distance traveled by the tool using summation of the calculated velocity with respect to time. The processor may calculate the distance traveled by the tool by averaging the calculated velocity over a plurality of measurements and multiplying by time. The processor may calculate the distance traveled by the tool using a piecewise summation with respect to time. The at least one radially retractable braking arm may be a plurality of braking arms.

An example embodiment may include a method for determining the location of a tool in a wellbore comprising measuring a first borehole magnetic anomaly with respect to time at a first location on a tool, measuring the first borehole magnetic anomaly with respect to time at a second location on a tool a predetermined distance from first location, comparing the time difference between the first magnetic anomaly at the first location with the first magnetic anomaly at the second location, calculating the velocity of the tool based on the comparison of the time difference of the first magnetic anomaly at the first location with the first magnetic anomaly at the second location, the time, and the distance between the first location and the second location, calculating the distance traveled by the tool based on the velocity calculation, deploying at least one braking arm when the location of the tool approaches predetermined location, stopping the tool at the predetermined location; and activating a downhole device at the predetermined location.

A variation of the example embodiment may include executing a preprogrammed function when the tool travels a predetermined distance. It may include comparing the measured first magnetic anomaly at the first location with log data. It may correct the measured first magnetic anomaly at the first location with log data. It may compare the measured first magnetic anomaly at the second location with log data. It may correct the measured first magnetic anomaly at the second location with log data. It may measure time to determine the time differential between the measurement at the first location and the measurement at the second location. It may generate a first electromagnetic field. It may generate a second electromagnetic field. The calculation of the distance may include integrating the calculated velocity with respect to time. Calculating the distance may include summation of the calculated velocity with respect to time. Calculating the distance may include averaging the calculated velocity over a plurality of measurements and multiplying by time. Calculating the distance may include a piecewise summation with respect to time. Activating a downhole device at a predetermined location may include explosively perforating a wellbore, setting a bridge plug, setting an expandable or explosively cutting a tubular.

An example embodiment may be a system for use downhole including a plugging tool having a cylindrical housing, a first end, a distal end, an axis, and a packer, an autonomous tool with a first end, a second end, located coaxial with the axis, wherein the second end of the autonomous tool is coupled to the first end of the plugging tool, the autonomous tool further comprising, a top housing with a first end, a second end, located coaxial with the axis, a bottom housing with a first end located proximate to the second end of the top housing, and a second end, wherein the bottom housing is coaxial with the axis, a first magnetic anomaly sensor located within the first housing, a second magnetic anomaly sensor located with the second housing, and a processor located within the top housing, operatively connected to the first magnetic anomaly sensor and the second magnetic anomaly sensor, wherein the processor compares data from the first magnetic anomaly sensor and the second magnetic anomaly sensor to determine the velocity of the autonomous tool and then calculating the distance the autonomous tool has traveled downhole using the calculated velocity.

A variation of the example embodiment may have a plurality of electromagnetic coils disposed within the first magnetic anomaly sensor. A first electromagnetic coil may be disposed within the first magnetic anomaly sensor adapted to generate an electromagnetic field. A second electromagnetic coil may be disposed within the first magnetic anomaly sensor adapted to generate an electromagnetic field. A third electromagnetic coil may be disposed within the first magnetic anomaly sensor adapted to detect an electromagnetic field. A fourth electromagnetic coil may be disposed within the first magnetic anomaly sensor adapted to detect an electromagnetic field. A fifth electromagnetic coil may be disposed within the first magnetic anomaly sensor adapted to detect an electromagnetic field. A sixth electromagnetic coil may be disposed within the first magnetic anomaly sensor adapted to detect an electromagnetic field.

Further variations of the example embodiment may include a first sub being coupled to the first end of the top housing. A second sub may be coupled to the second end of the top housing and coupled to the first end of the bottom housing. A third sub may be coupled to the second end of the bottom housing. The first centralizer may have a hollow cylindrical shape. The second centralizer may have a substantially hollow cylindrical shape. A cylindrical core may be located coaxial with the axis and passing through the first, second, third, fourth, fifth, and sixth electromagnets. It may include a plurality of electromagnetic coils disposed within the second magnetic anomaly sensor. A seventh electromagnetic coil may be disposed within the second magnetic anomaly sensor adapted to generate an electromagnetic field. An eighth electromagnetic coil may be disposed within the second magnetic anomaly sensor adapted to generate an electromagnetic field. A ninth electromagnetic coil may be disposed within the second magnetic anomaly sensor adapted to detect an electromagnetic field. A tenth electromagnetic coil may be disposed within the second magnetic anomaly sensor adapted to detect an electromagnetic field. An eleventh electromagnetic coil may be disposed within the second magnetic anomaly sensor adapted to detect an electromagnetic field. A twelfth electromagnetic coil may be disposed within the second magnetic anomaly sensor adapted to detect an electromagnetic field.

Further variations of the example embodiment may include a cylindrical core located coaxial with the axis and passing through the first, second, third, fourth, fifth, and sixth electromagnets. The processor may include a data logger. The processor may include a plurality of processors. The processor may compute the velocity by comparing measurements taken from the first magnetic anomaly sensor and the second magnetic anomaly sensor. A first centralizer may surround a portion of the first end of the top housing. A second centralizer may surround a portion of the second end of the top housing and a portion of the second end of the bottom housing. The top housing may be composed of a frangible material. The top housing may be composed of a ceramic material. The top housing may be composed of steel. The bottom housing may be composed of a frangible material. The bottom housing may be composed of a ceramic material. The bottom housing may be composed of steel. The packer may be composed of metal. The packer may be composed of a hard rubber. A braking assembly may be coupled to the first end of the top housing. A jet cutter may be coupled to the braking assembly. A jet cutter may be coupled to autonomous tool.

Further variations of the disclosed embodiments may include the processor calculating the distance traveled by the tool based on the calculated instantaneous velocity. The processor may calculate the distance traveled by the tool by integrating the calculated velocity with respect to time. The processor may calculate the distance traveled by the tool using summation of the calculated velocity with respect to time. The processor may calculate the distance traveled by the tool by averaging the calculated velocity over a plurality of measurements and multiplying by time. The processor may calculate the distance traveled by the tool using a piecewise summation with respect to time.

An example embodiment may include a method for locating a downhole tool comprising inserting an autonomous tool into a borehole, moving the autonomous tool down the borehole, programming the autonomous tool to execute a command at a predetermined location within the borehole, detecting a set of borehole magnetic anomalies at a first location on the autonomous tool, detecting the set of borehole magnetic anomalies at a second location on the autonomous tool, comparing the detection at the first location with the detection at the second location, calculating the velocity of the autonomous tool based on the comparison the set of borehole magnetic anomalies measured at the first location and second location, calculating the position of the tool based on the calculated velocity, automatically braking the autonomous tool as it approaches a predetermined location, holding the autonomous tool at a predetermined location, and activating at least one downhole device at the predetermined location.

A variation of the embodiment may include the autonomous tool generating an electromagnetic field at a first location in the autonomous tool. The autonomous tool may generate an electromagnetic field at a second location in the autonomous tool. It may detect casing collars based on the detected borehole magnetic anomalies. It may execute a command to fire a perforating gun. It may execute a command to deploy a brake assembly. It may execute a command to fire a pipe severing tool. It may executed a command to expand a plug within the borehole. It may move the autonomous tool by dropping it down a wellbore. Moving the autonomous tool may include pumping it down a wellbore. It may calculate the position by integrating the calculated velocity with respect to time. It may calculate the position by a summation of the calculated velocity with respect to time. It may calculate the position by averaging the calculated velocity over a plurality of measurements and multiplying by time. It may calculate the position of the tool using a piecewise summation with respect to time. Activating a downhole device at a predetermined location may include explosively perforating a wellbore, setting a bridge plug, setting an expandable or cutting a tubular.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly.

DETAILED DESCRIPTION OF EXAMPLES OF THE INVENTION

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

For plug and abandonment applications in oil wells, a cutter and/or plug must be sent downhole, via electric line or tubing, in a single or separate trip, in order to plug the tubular and then cut to retrieve the remaining tubular to surface. This process is costly due to rig time during the conveyance process and the logistics of getting the conveyance unit to the well site. Using autonomous technology, a cutter, a plug and/or a combination of a cutter and plug, could be dropped downhole without being tied to any conveyance, self-navigate, and perform its purpose at a pre-determined depth because the well will be abandoned, there is no worry about leaving the remnants of the autonomous tool at the bottom of the well.

Figure 1:
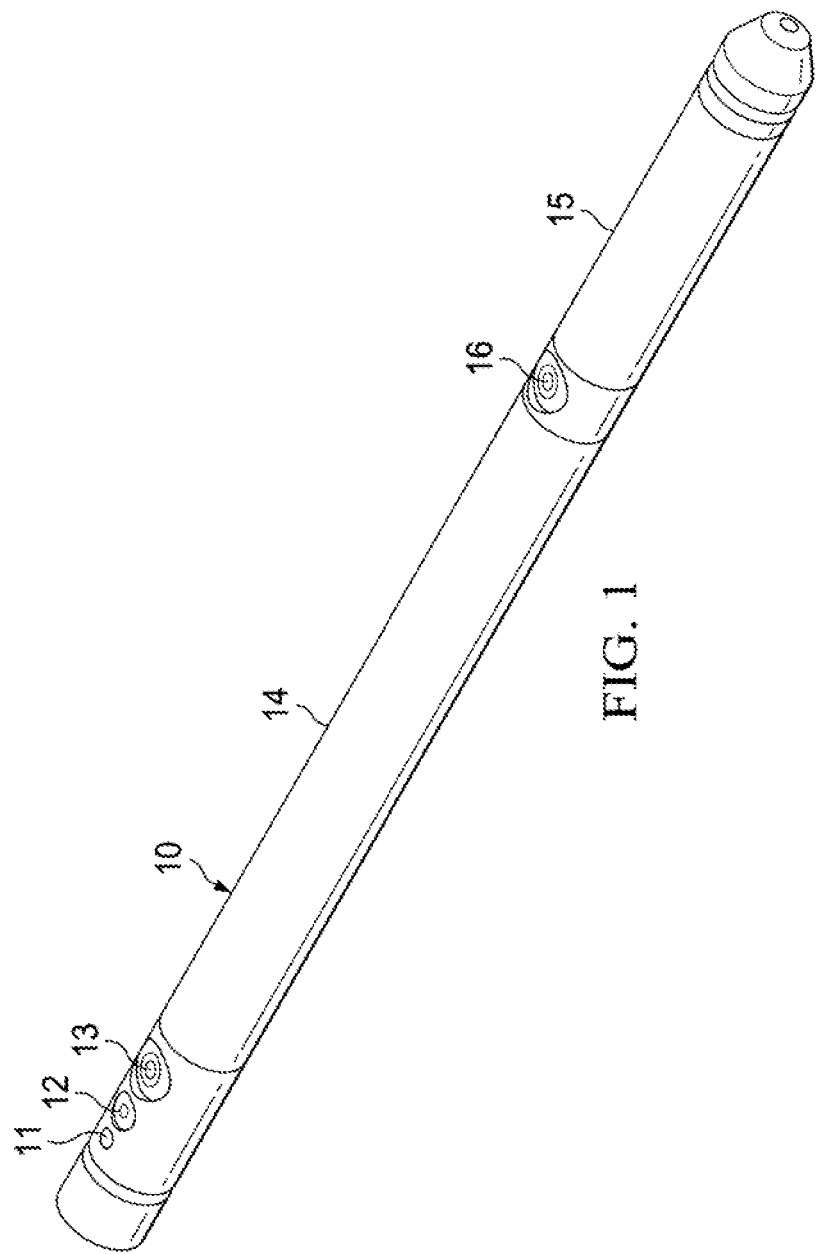
FIG. 1 shows an example embodiment of an autonomous downhole tool coupled to a casing collar locator.

An example embodiment is shown in FIG. 1 of a tool assembly 10 with sensor 15 disposed within a housing and an electronics and battery section 14 15 disposed within a housing having programming/wiring ports 13 and 16, and lanyard switch 12. The sensor 15 may be a magnetic anomaly detector, such as a casing collar locator. Pressure safety switch 11 keep safe the ballistic hardware, such as casing cutters, braking mechanisms, setting tools and casing plugs, that can be attached to the tool until a depth in the well has been reached in where the hydrostatic pressure exerted by the fluids in the well are great enough to move the safety switch 11 from the safe mode to the armed mode. The sensor 15 is used to detect magnetic anomalies, such as casing connections and collars, and use these anomalies to determine the tools velocity and location as the tool descends into the well. The magnetic anomalies can be any unique magnetic feature in the tubing or casing and not limited only to collars or connections.

The electronics and battery section 14 contain a processor or a plurality of processors. The electronics and battery section 14 may include a data logger coupled to at least one processor. The processor computes the location of the tool using measurements taken from the sensor 15. Upon reaching a predetermined depth in the well whose location was determined by the electronics and battery section 14, the processer will initiate a preprogrammed event or events. These events can be the firing of a cutter to cut tubing or casing, the actuating of a braking mechanism to stop the tools decent, the initiation of a ballistic setting tool to set a plug in the tubing or casing, or a combination of the forgoing events. Programming and configuration of the tool 10 is accomplished by connecting the tool 10 to a computer via the programming/wiring ports 13 and 16.

Prior to connecting any ballistic elements (cutters, brakes or setting tools) to the tool 10, the electrical connections of the pressure safety switch 11 is checked to ensure that they are electrically shorted. These switches ensure that when ballistic elements are connected to the tool, no unintentional electrical energy can be applied to the ballistic elements until a predetermined hydrostatic well pressure has been exceeded. The pressure safety switch 11 is constructed using a spring loaded differential piston actuator in which one side of the piston's surface area is much larger than the other. The larger side of the piston is spring loaded with a spring of a known compression rate. When the differential piston actuator is exposed to external hydrostatic pressures, the hydrostatic pressure effectively applies a greater force to the side of the piston with the larger surface area than it does to the side of the piston with the smaller surface area. This differential pressure causes the larger side of the piston to move against the spring load. At hydrostatic pressures greater than 700 PSI, the differential piston actuator has moved enough to remove the connection that was shorting the connection between the electronics & battery section and the ballistic element.

The lanyard switch 12 is an electro-mechanical switch that must be activated before the tool will start looking for magnetic anomalota and start calculating its velocity and the distance traveled. This switch may be activated by the removal of a safety clip attached to a lanyard when the tool is released to fall into the well.

Figure 2:
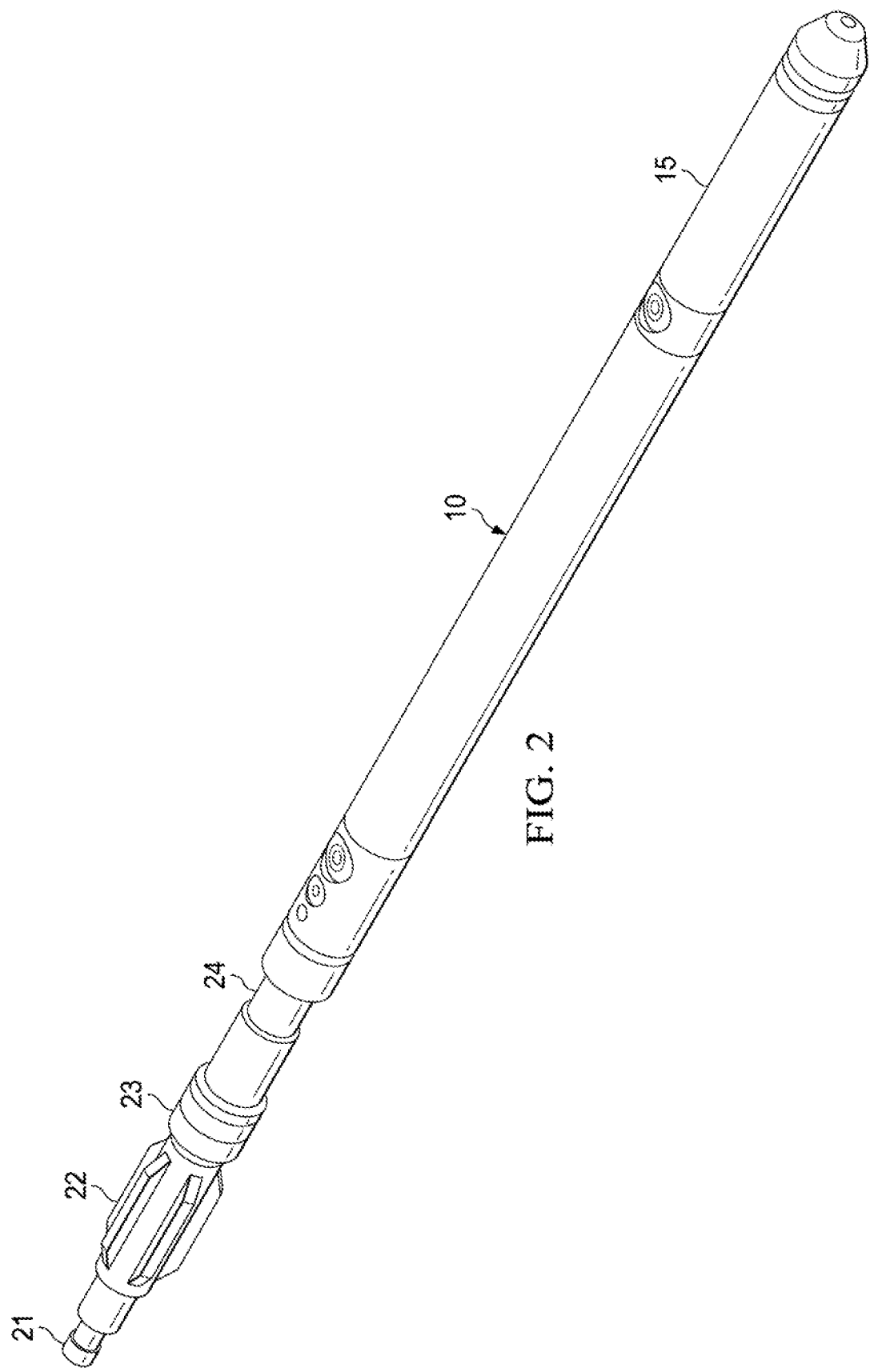
FIG. 2 shows an example embodiment of an autonomous downhole tool coupled to a centralizer and a fishing neck.

An example embodiment is shown in FIG. 2 of a tool assembly 10 from FIG. 1. The tool assembly 10 is coupled to a firing head assembly 24 having a tubular cutter 23 attached. A centralizer 22 is also shown coupled above the cutter 23. A fishing neck 21 is located above the centralizer 22. The sensor 15 is used to detect magnetic anomalies, such as casing connections and collars, and use these anomalies to determine the tools velocity and location as the tool descends into the well. The magnetic anomalies can be any unique magnetic feature in the tubing or casing and not limited only to collars or connections.

Figure 3:
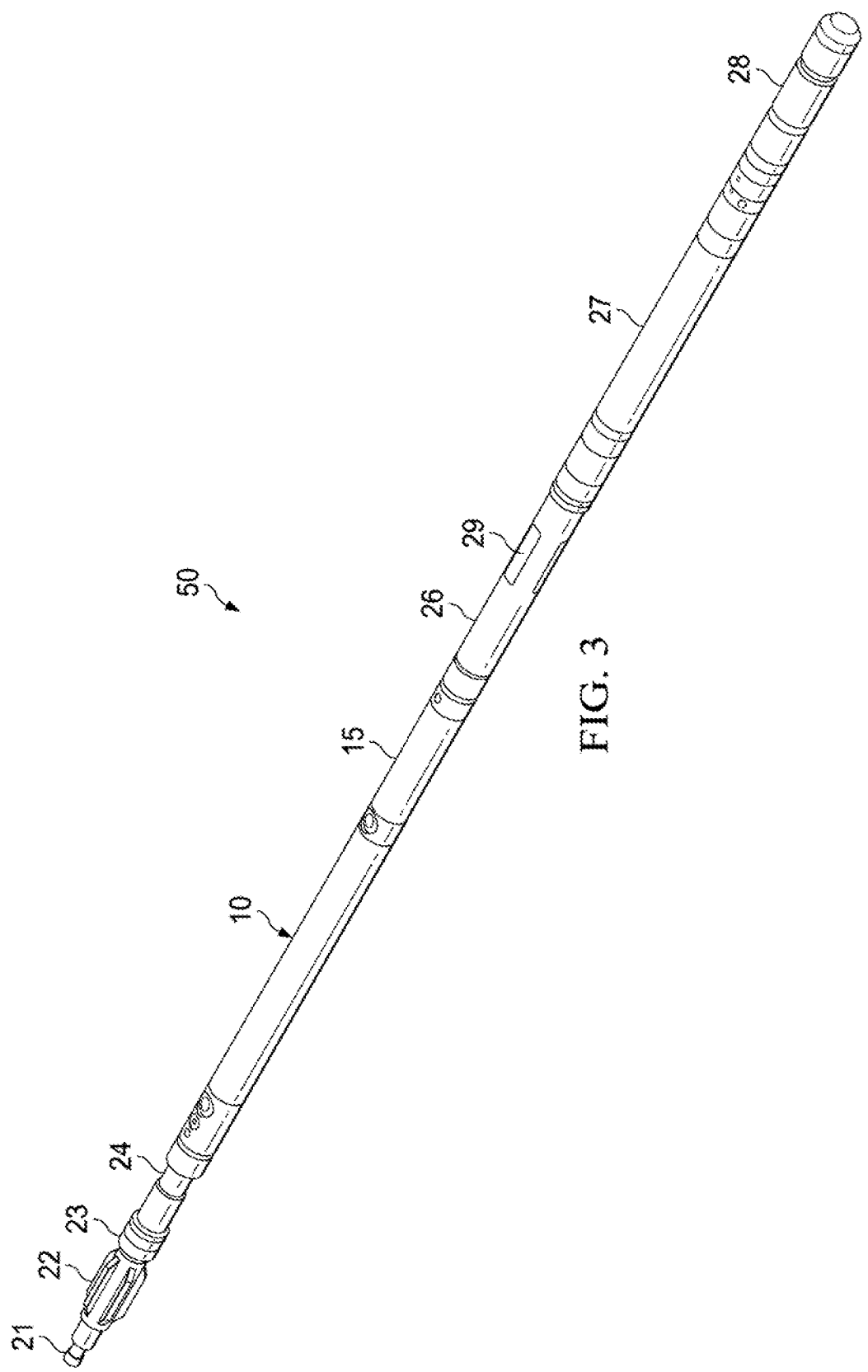
FIG. 3 shows an example embodiment of an autonomous downhole tool coupled to firing head assembly, a brake assembly, and a setting tool.

An example embodiment is shown in FIG. 3 with a tool assembly 50 is configured with a cutter 23, a ballistic braking system 26 15 disposed within a housing, a setting tool 27 15 disposed within a housing, and a casing plug 28. The tool assembly 50 also includes a fishing neck 21, a centralizer 22, and a firing head assembly 24. The ballistic braking system 26 includes at least one radially retractable braking arm 29. In this configuration the ballistic braking system 26 is shown with the radially retractable braking arm 29 fully retracted.

After launching and upon reaching a predetermined depth in the well, the autonomous tool 10 fires the ballistic braking system 26. Firing the ballistic brake system 26 releases the spring loaded braking arms 29 from the body of the ballistic brake, allowing the braking arms 29 to dig into the inside walls of the casing or tubing, thus slowing and stopping the decent of the tool assembly 50. Around the same time the braking arms 29 are released and an igniter in the setting tool 27 is activated, thus initiating the operation of the setting tool 27. The setting tool 27 generates the mechanical force necessary to set the plug 28 in the casing by using gas pressure generated by a slow burning pyrotechnic contained within the body of the setting tool 27. Immediately upon detecting the shock generated by the setting tool 27 when the plug 28 has been set, the autonomous tool 10 will fire the cutter 23, thus severing the casing. The casing or tubing can then be removed and the tool assembly 50, along with its attachments, can be abandoned in the well. The sensor 15 is used to detect magnetic anomalies, such as casing connections and collars, and use these anomalies to determine the tools velocity and location as the tool descends into the well. The magnetic anomalies can be any unique magnetic feature in the tubing or casing and not limited only to collars or connections.

Figure 4:
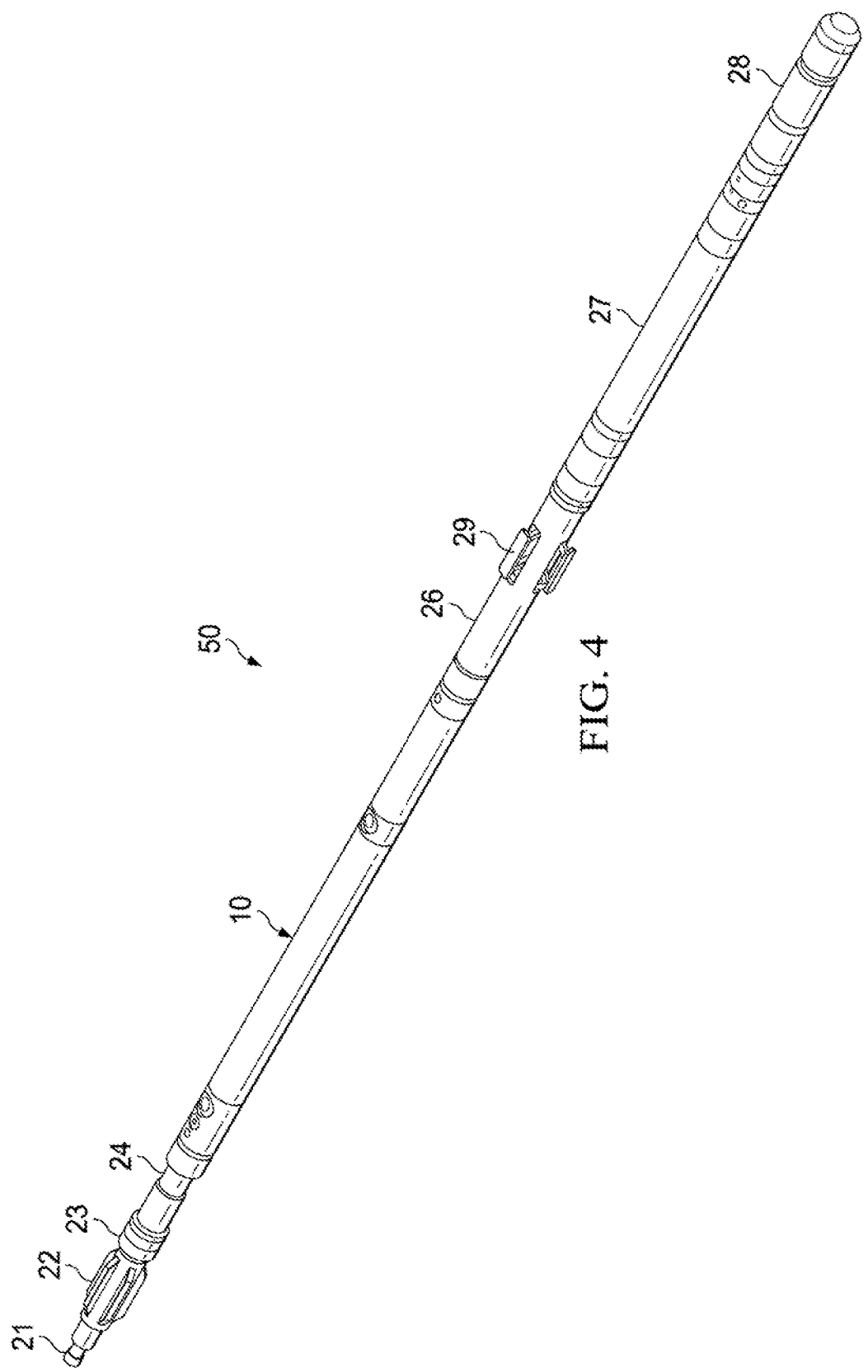
FIG. 4 shows an example embodiment of an autonomous downhole tool coupled to firing head assembly, a brake assembly with the brake pads extended, and a setting tool.

An example embodiment is shown in FIG. 4 with a tool assembly 50 is configured with a cutter 23, a ballistic braking system 26, setting tool 27 and a casing plug 28. The tool assembly 50 also includes a fishing neck 21, a centralizer 22, and a firing head assembly 24. After launching and upon reaching a predetermined depth in the well, the autonomous tool 10 fires the ballistic braking system 26. Firing the ballistic brake system 26 releases the spring loaded braking arms 29 from the body of the ballistic brake, allowing the braking arms 29 to dig into the inside walls of the casing or tubing, thus slowing and stopping the decent of the tool assembly 50. Around the same time the braking arms 29 are released and an igniter in the setting tool 27 is activated, thus initiating the operation of the setting tool 27. The setting tool 27 generates the mechanical force necessary to set the plug 28 in the casing by using gas pressure generated by a slow burning pyrotechnic contained within the body of the setting tool 27. Immediately upon detecting the shock generated by the setting tool 27 when the plug 28 has been set, the autonomous tool 10 will fire the cutter 23, thus severing the casing. The casing or tubing can then be removed and the tool assembly 50, along with its attachments, can be abandoned in the well. The depiction in FIG. 4 shows the braking arms 29 of the ballistic brake system 26 in the deployed configuration.

Figure 5:
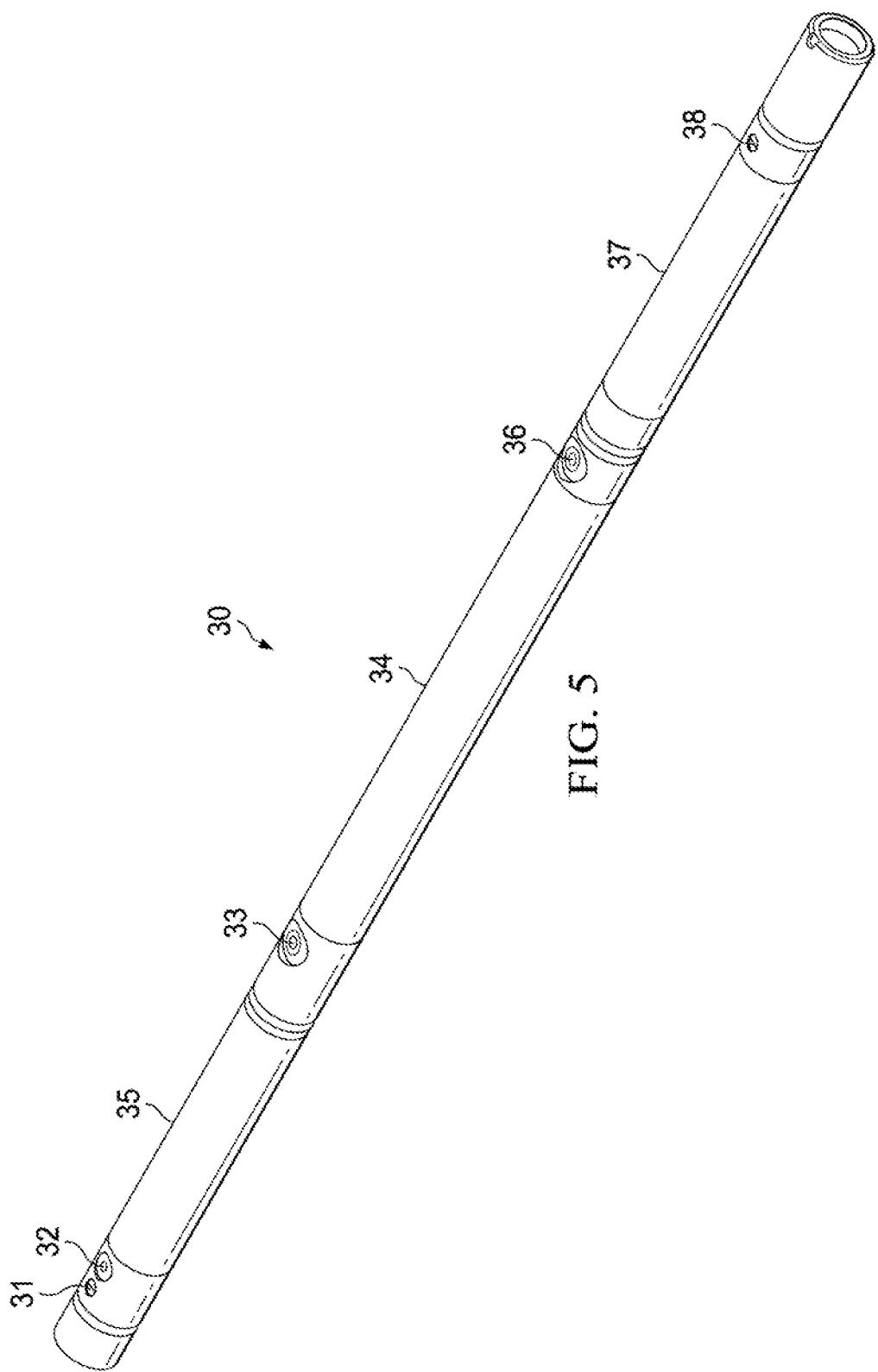
FIG. 5 shows an example embodiment of an autonomous downhole tool coupled to two casing collar locators.

An example embodiment is shown in FIG. 5 of a tool assembly 30 with two matched differential velocity sensors 35 and 37, each 15 disposed within a its own housing, are separated on an axis of a known distance by a housing assembly containing an electronics and battery section 34, having programming/wiring ports 33 and 36, and lanyard switch 32. The differential velocity sensors 35 and 37 may be matched differential magnetic anomaly sensors or equivalent casing collar locators. Pressure safety switches 31 and 38 are positioned at the end of each of the differential velocity sensors 35 and 37, respectfully, that render the ballistic hardware, such as casing cutters, braking mechanisms, setting tools and casing plugs, that can be attached to the tool safe until a depth in the well has been reached in where the hydrostatic pressure exerted by the fluids in the well are great enough to move the safety switches 31 and 38 from the safe mode to the armed mode. The safety switches 31 and 38 must be moved to the armed mode before any ballistic event can be activated.

The matched differential velocity sensors 35 and 37 are used to detect magnetic anomalies, such as casing connections and collars, and use these anomalies to determine the tool's velocity as the tool descends into the well. Matching the differential velocity sensors 35 and 37 provides for increased accuracy in identifying the magnetic anomalies and their position within the tubing or casing string. The magnetic anomalies can be any unique magnetic feature in the tubing or casing and not limited only to collars or connections.

The disclosed sensors may be a magnetic anomaly detector, which generally includes a plurality of electromagnetic coils disposed therein. It may have a first electromagnetic coil disposed within the magnetic anomaly sensor adapted to generate an electromagnetic field. There may be a second electromagnetic coil disposed within the magnetic anomaly sensor adapted to generate an electromagnetic field. There may be a third electromagnetic coil disposed within the magnetic anomaly sensor adapted to detect an electromagnetic field. There may be a fourth electromagnetic coil disposed within the magnetic anomaly sensor adapted to detect an electromagnetic field. There may be a fifth electromagnetic coil disposed within the magnetic anomaly sensor adapted to detect an electromagnetic field. There may be a sixth electromagnetic coil disposed within the magnetic anomaly sensor adapted to detect an electromagnetic field.

The electronics and battery section 34 contains a processor or a plurality of processors. The processor computes the velocity of the tool by comparing measurements taken from the first matched differential velocity sensor 35 and the second differential velocity sensor 37. The processor calculates distance traveled by integrating the calculated velocity with respect to time. The processor calculates the distance traveled using a summation of the calculated velocity with respect to time. The processor can also calculate the distance traveled by averaging the calculated velocity over a plurality of measurements and multiplying by time. The processor may also calculate the distance traveled using a piecewise summation with respect to time. Upon reaching a predetermined depth in the well whose location was determined by the tool's time/velocity calculations, the processer will initiate a preprogrammed event or events. These events can include activating a downhole device, such as firing a cutter to cut tubing or casing, the actuating of a braking mechanism to stop the tools decent, the initiation of a ballistic setting tool to set a plug in the tubing or casing, activating a perforating gun, or a combination of the forgoing events.

Programming and configuration of the tool 30 is accomplished by connecting the tool 30 to a computer via the programming/wiring ports 33 and 36. The programming/wiring port cover is removed to allow access to the USB connector mounted within programming/wiring ports 33 and 36. The tool may be configured by entering the predetermined depth the event is to take place, the events to be initiated, and the casing or tubing profile. The casing or tubing profile is a sequential list of the individual length of the pieces of casing or tubing that is in the well, normally starting from the surface to the bottom of the well. After the tool 30 has been configured, it is placed in a low power standby mode, computer connections are removed and the covers for the programming/wiring port 33 and 36 are secured back into position.

Prior to connecting any ballistic elements (cutters, brakes or setting tools) to the tool 30, the electrical connections of the pressure safety switches 31 and 38 are checked to ensure that they are electrically shorted. These switches ensure that when ballistic elements are connected to the tool, no unintentional electrical energy can be applied to the ballistic elements until a predetermined hydrostatic well pressure has been exceeded. The pressure safety switches 31 and 38 are constructed using a spring loaded differential piston actuator in which one side of the piston's surface area is much larger than the other. The larger side of the piston is spring loaded with a spring of a known compression rate. When the differential piston actuator is exposed to external hydrostatic pressures, the hydrostatic pressure effectively applies a greater force to the side of the piston with the larger surface area than it does to the side of the piston with the smaller surface area. This differential pressure causes the larger side of the piston to move against the spring load. At hydrostatic pressures greater than 700 PSI, the differential piston actuator has moved enough to remove the connection that was shorting the connection between the electronics & battery section and the ballistic element.

The lanyard switch 32 is an electro-mechanical switch that must be activated before the tool will start looking for magnetic anomalies and start calculating its velocity and the distance traveled. This switch may be activated by the removal of a safety clip attached to a lanyard when the tool is released to fall into the well.

Figure 6:
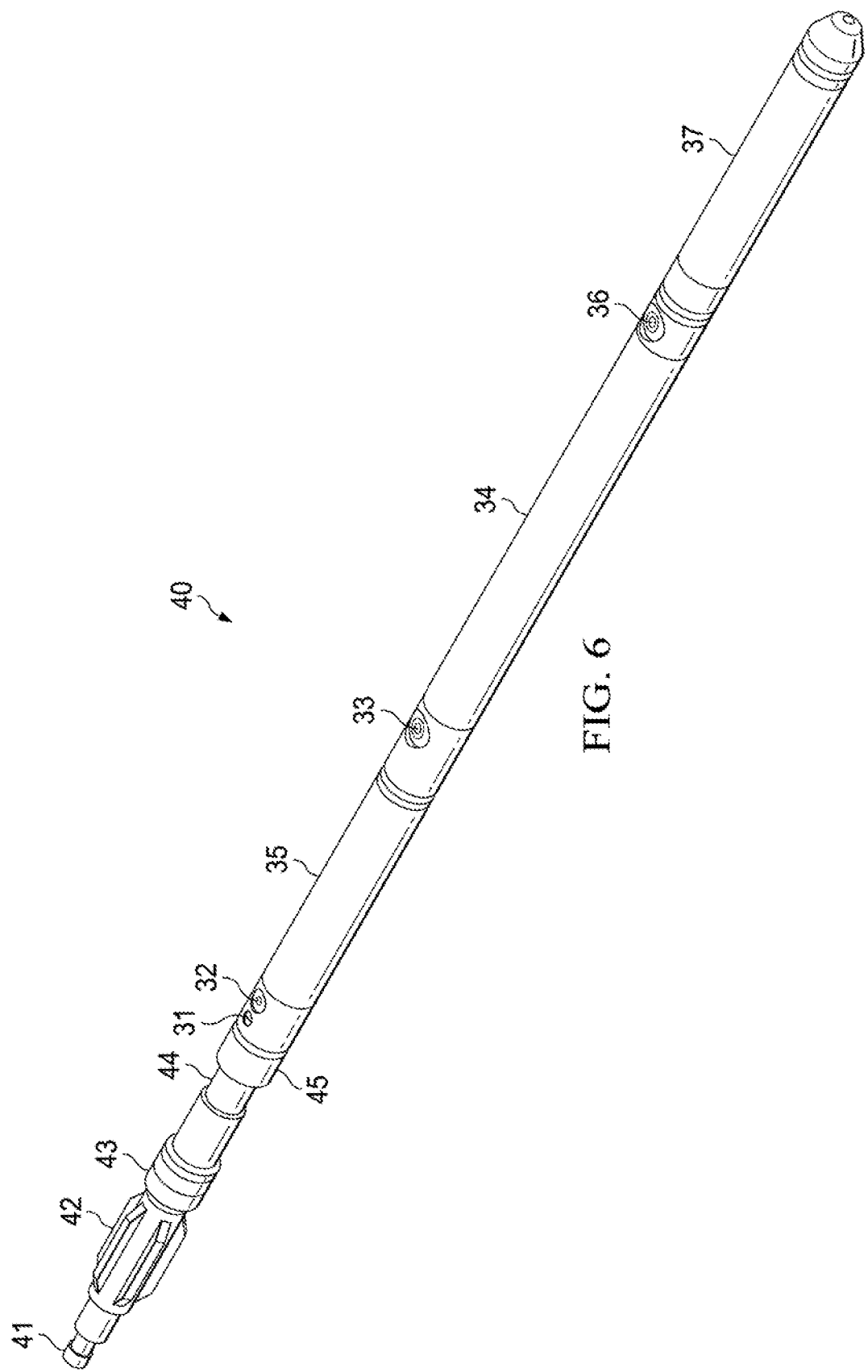
FIG. 6 shows an example embodiment of an autonomous downhole tool coupled to two casing collar locators and a cutter.

An example embodiment is shown in FIG. 6 with an autonomous tool 45 in a cutter only configuration assembly 40. A firing head 44 is attached above the tool 45. A centralizer 42 is also attached to prevent damage to the cutter 43 as the tool 40 drops into a well. The fish neck 41 attaches above the tool 45 and provides a means to temporarily attach handling equipment to the tool assembly 40 to facilitate its insertion in the well. In this mode of operation, the cutter 43 will be fired at a predetermined depth while the tool 45 is traveling down the well. After firing the cutter 41 the tool continues on to the bottom of the well. At the bottom of the well or after a period of time the tool will turn itself off and automatically discharge any remaining energy in the battery. Pressure safety switch 31 is positioned at the end of each of the differential velocity sensor 35. The lanyard switch 32 is an electro-mechanical switch that must be activated before the tool will start looking for magnetic anomalies and start calculating its velocity and the distance traveled. The electronics and battery section 34 contains a processor or a plurality of processors. The processor computes the velocity of the tool by comparing measurements taken from the first matched differential velocity sensor 35 and the second differential velocity sensor 37. The differential velocity sensors 35 and 37 may be matched differential magnetic anomaly sensors or equivalent casing collar locators. Programming and configuration of the tool 56 is accomplished by connecting the tool 56 to a computer via the programming/wiring ports 33 and 36.

Figure 7:
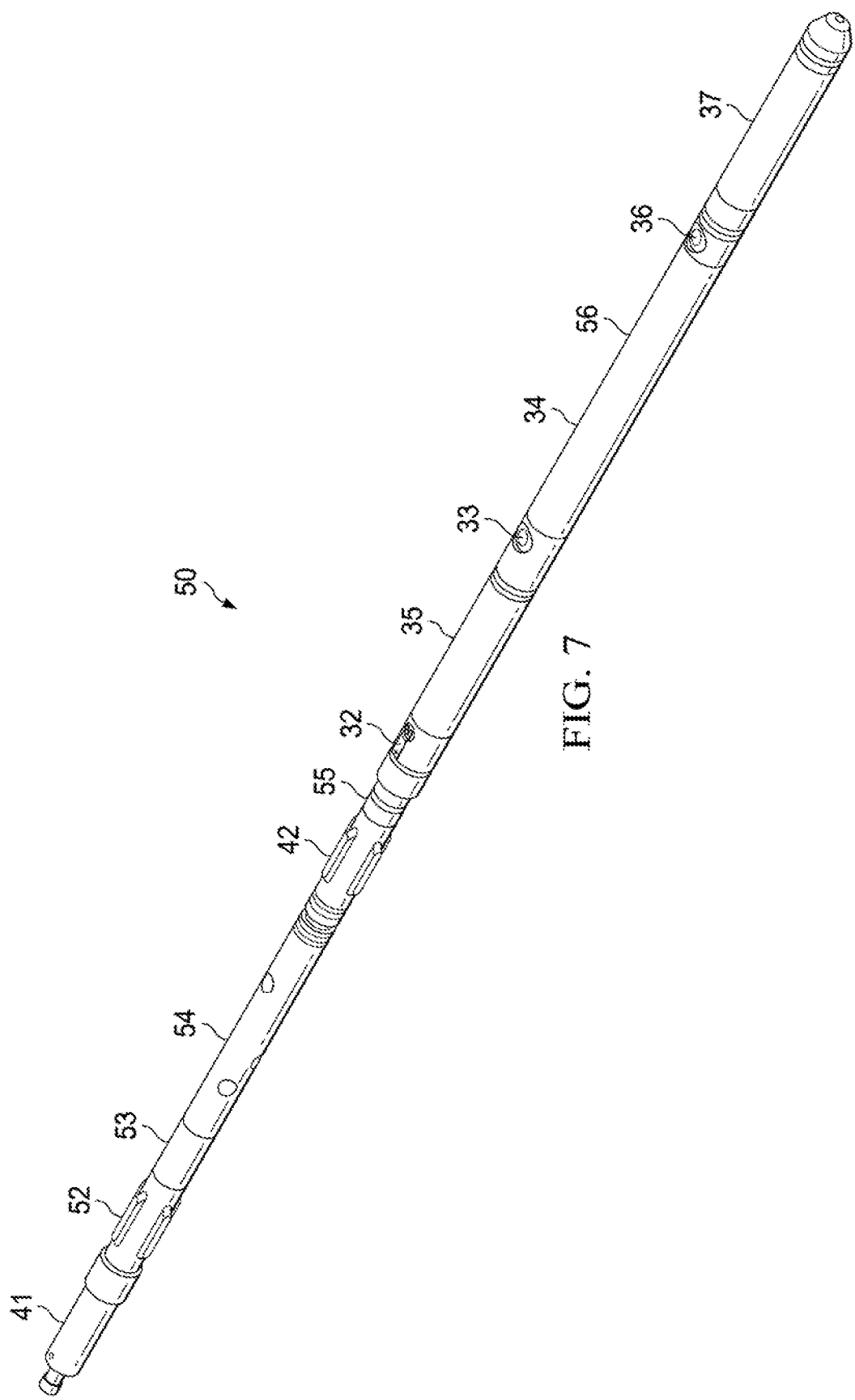
FIG. 7 shows an example embodiment of an autonomous downhole tool coupled to two casing collar locators and a perforating gun.

An example embodiment is shown in FIG. 7 with an autonomous tool 56 in a perforating gun configuration assembly 50. Centralizers 52 and 42 protect the perforating gun 54 as the autonomous tool 56 drops into a well. The fish neck 41 attaches above the perforating gun 54 and provides a means to temporarily attach handling equipment to the tool 56 to facilitate its insertion in the well. In this mode of operation, the perforating gun 54 with its plug/shot assembly 53 and top fire assembly 55 will be fired at a predetermined depth while the tool 56 is traveling down the well. After firing the perforating gun 54 the tool 56 continues on to the bottom of the well. At the bottom of the well or after a period of time the tool will turn itself off and automatically discharge any remaining energy in the battery. The lanyard switch 32 is an electro-mechanical switch that must be activated before the tool will start looking for magnetic anomalies and start calculating its velocity and the distance traveled. The electronics and battery section 34 contains a processor or a plurality of processors. The processor computes the velocity of the tool by comparing measurements taken from the first matched differential velocity sensor 35 and the second differential velocity sensor 37. The differential velocity sensors 35 and 37 may be matched differential magnetic anomaly sensors or equivalent casing collar locators. Programming and configuration of the tool 56 is accomplished by connecting the tool 56 to a computer via the programming/wiring ports 33 and 36.

The autonomous tool and its attachments will be assembled and armed on surface at the wellsite. The electronics section will be uploaded with the tally for depth correlation (such as a casing collar locator or "CCL") and target initiation depths via a USB programming port that is accessible through the programming/wiring ports. The tools will be dropped in the well via custom launching equipment. When the tool drops, the lanyard will disconnect from the launching system "turning the tool on". The autonomous tool will fall via gravity or be pumped from surface. For safety, adequate hydrostatic pressure must be present to connect the firing circuit to the Electronics section. The tool will use the matched differential velocity sensors or matched differential magnetic anomaly sensors (such as a casing collar locator or "CCL") located at each end of the Tool and acceleration algorithms to self-navigate to programmed depths and then initiate the cutter, and/or the braking system, setting tool and plug. These initiations could happen simultaneously or at different predetermined depths. The remnants of the autonomous tool and its attachments would be left downhole.

One of the purposes of the disclosed embodiments is to accurately identify casing collars as the tool is either freefalling or being pumped down a cased hole. Pumping the tool downhole may be necessary for horizontal wells. One issue is that there are other anomalies that may confuse a more traditional casing collar locator. The use of two differential spaced magnetic sensors and digital signal processing matching algorithms may continuously determine the velocity of the tool. The tool may then calculate the distance the tool has traveled. The distance calculation may include integrating the velocity over time, summation of the discrete velocity data, average the velocity information multiplied by time, or a piecewise summation method. The tool may start measuring velocity as soon as it enters the wellbore. The tool may use collars, anomalies, and/or both to determine velocity. By determining the distance traveled accurately, the tool can perform certain functions at a pre-determined location in the well including setting a plug, cutting pipe, or detonating a perforating gun.

Although the invention has been described in terms of particular embodiments which are set forth in detail, it should be understood that this is by illustration only and that the invention is not necessarily limited thereto. For example, terms such as upper and lower or top and bottom can be substituted with uphole and downhole, respectfully. Top and bottom could be left and right, respectively. Uphole and downhole could be shown in figures as left and right, respectively, or top and bottom, respectively. Generally downhole tools initially enter the borehole in a vertical orientation, but since some boreholes end up horizontal, the orientation of the tool may change. In that case downhole, lower, or bottom is generally a component in the tool string that enters the borehole before a component referred to as uphole, upper, or top, relatively speaking. The first housing and second housing may be top housing and bottom housing, respectfully. In a gun string such as described herein, the first gun may be the uphole gun or the downhole gun, same for the second gun, and the uphole or downhole references can be swapped as they are merely used to describe the location relationship of the various components. Terms like wellbore, borehole, well, bore, oil well, and other alternatives may be used synonymously. Terms like tool string, tool, perforating gun string, gun string, or downhole tools, and other alternatives may be used synonymously. A tool, tool string, or tool assembly is generally cylindrical in shape and has a common axis that is shared by most of the cylindrical components. This common axis is generally parallel or coaxial with the center axis of the wellbore or casing that the tool string is located. Each component may be contained within its own housing or they may be grouped within a common housing. The axis of a wellbore or casing changes with depth as a well may start vertical, but then gradually become horizontal at a certain depth within the earth. Therefore, the common axis, terms such as uphole or downhole, are all relative in that in a horizontal or deviated well the terms are still used as if the well were vertical. The alternative embodiments and operating techniques will become apparent to those of ordinary skill in the art in view of the present disclosure. Accordingly, modifications of the invention are contemplated which may be made without departing from the spirit of the claimed invention.

What is claimed is:

1. An apparatus for use downhole comprising:
    a cylindrical housing with a first end, a second end, an axis;
        a first magnetic anomaly sensor located within the cylindrical housing;
        a second magnetic anomaly sensor located within the cylindrical housing and located a fixed axial distance from the first magnetic anomaly sensor;
        a processor located within the cylindrical housing, operatively connected to the first magnetic anomaly sensor and the second magnetic anomaly sensor, wherein the processor compares the measurements of the first magnetic anomaly sensor, the second magnetic anomaly sensor, the time differential of those measurements, and with the fixed axial distance between the two sensors, calculates the instantaneous velocity of the tool; and
        at least one radially retractable braking arm located in the cylindrical housing, wherein the processor can command the braking arm to extend against a wellbore and stop the downhole descent of the apparatus at a predetermined location.

2. The apparatus of claim 1 further comprising a plurality of processors, wherein the processors determine the location of the tool within the wellbore and execute commands at one or more predetermined locations.

3. The apparatus of claim 1 further comprising the processor having stored log data of the wellbore and comparing that to the two measurements to fine tune the velocity calculation.

4. The apparatus of claim 1 wherein the first magnetic anomaly sensor comprises a plurality of electromagnetic coils oriented about the axis.

5. The apparatus of claim 1 wherein the second magnetic anomaly sensor comprises a plurality of electromagnetic coils wrapped oriented about the axis.

6. The apparatus of claim 1 wherein the cylindrical housing is composed of a frangible material.

7. The apparatus of claim 1 wherein the cylindrical housing is composed of a ceramic material.

8. The apparatus of claim 1 wherein the cylindrical housing is composed of steel.

9. The apparatus of claim 1 wherein the processor calculates the distance traveled by the tool based on the calculated instantaneous velocity.

10. The apparatus of claim 1 wherein the processor calculates the distance traveled by the tool by integrating the calculated velocity with respect to time.

11. The apparatus of claim 1 wherein the processor calculates the distance traveled by the tool using summation of the calculated velocity with respect to time.

12. The apparatus of claim 1 wherein the processor calculates the distance traveled by the tool by averaging the calculated velocity over a plurality of measurements and multiplying by time.

13. The apparatus of claim 1 wherein the processor calculates the distance traveled by the tool using a piecewise summation with respect to time.

14. The apparatus of claim 1 wherein the at least one radially retractable braking arm is a plurality of radially retractable braking arms located about the axis.

15. The apparatus of claim 1 further comprising a first centralizer surrounding a portion of the first end of the housing, wherein the first centralizer centralizes the housing in a wellbore.

16. The apparatus of claim 15 further comprising a second centralizer surrounding a portion of the second end of the housing, wherein the second centralizer centralizes the housing in a wellbore.

17. The apparatus of claim 1 further comprising a perforating gun assembly coupled to the housing, wherein the processor is electrically coupled to the perforating gun assembly and can fire the perforating gun assembly at a predetermined location.

18. The apparatus of claim 1 further comprising a cutter assembly coupled to the housing, wherein the processor is electrically coupled to the cutter assembly and can fire the cutter assembly at a predetermined location.

19. The apparatus of claim 1 further comprising a setting tool coupled to the housing, wherein the processor is electrically coupled to the setting tool and can activate the setting tool at a predetermined location to plug the wellbore.

20. The apparatus of claim 1, wherein the processor is capable of fully autonomous operation once it enters the wellbore.

* * * * *